United States Patent
Ford, Sr.

(10) Patent No.: US 7,757,942 B1
(45) Date of Patent: Jul. 20, 2010

(54) BIOMETRIC CHARGE CARD VERIFICATION SYSTEM AND ASSOCIATED METHOD

(76) Inventor: Ronald Ford, Sr., 103 Royal Oak Dr., San Diego, CA (US) 92114

( * ) Notice: Subject to any disclaimer, the term of this patent is extended or adjusted under 35 U.S.C. 154(b) by 132 days.

(21) Appl. No.: 11/901,629

(22) Filed: Sep. 18, 2007

Related U.S. Application Data

(60) Provisional application No. 60/825,962, filed on Sep. 18, 2006.

(51) Int. Cl.
 *G06K 5/00* (2006.01)
(52) U.S. Cl. .................................................... 235/380
(58) Field of Classification Search ................. None
 See application file for complete search history.

(56) References Cited

U.S. PATENT DOCUMENTS

| | | | |
|---|---|---|---|
| 2005/0184052 A1* | 8/2005 | Carver et al. ............... 219/543 |
| 2005/0201597 A1* | 9/2005 | Wendt et al. ............... 382/125 |
| 2008/0141117 A1* | 6/2008 | King et al. ............... 715/238 |
| 2008/0223925 A1* | 9/2008 | Saito et al. ............... 235/380 |

* cited by examiner

*Primary Examiner*—Michael G Lee
*Assistant Examiner*—David Tardif

(57) ABSTRACT

A charge card identification system includes a portable base station with a mechanism for heating a top surface area of the base station to a desired temperature such that the user can place a user finger on the selected surface area. The system further includes a portable charge card, a heat detecting circuit electrically coupled to a finger print reader, a processor electrically coupled to the finger print reader and a memory. Such a memory includes software instructions that cause the finger print reader to calculate the finger print image based upon the detected peaks and valleys of the user finger. The system further includes a mechanism for verifying a user identity based upon the recorded finger print image such that the user is authorized to execute the sales transaction.

10 Claims, 5 Drawing Sheets

BIOMETRIC CHARGE CARD VERIFICATION SYSTEM AND ASSOCIATED METHOD

CROSS REFERENCE TO RELATED APPLICATIONS

This application claims the benefit of U.S. Provisional Application No. 60/825,962, filed Sep. 18, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to biometrically activated charge cards and, more particularly, to a charge card identification system for authorizing a user to execute a sales transaction at a point of sale location based upon biometric information of an authorized user.

2. Prior Art

The problem of forged ID cards in the U.S. is a lot more pervasive and ubiquitous than most people realize. New hologram and encoding technologies invented to curb the fake-ID market have, in fact, backfired. Cheap Internet templates, and high-quality printers and card-pressing machines, have led to a steep rise in fake-ID websites and ID "chop shops." That has police and motor vehicle departments across the country, to say nothing of the FBI, scrambling to thin the ranks of college students, illegal immigrants, and outright thieves sporting wallets full of high-quality fake identification. While the FBI worries more about identity theft and credit-card fraud, the explosion in the fake-ID market is a bold warning about a world where false identities are becoming easy to create. And with theft and forgery becoming more anonymous via the World Wide Web, the trend is only becoming more pervasive. In four separate stings during spring break in Florida this year, police netted more than 10,000 fake IDs and arrested 350 minors. By that estimate, police say there are likely millions of fake IDs in circulation throughout the country today.

Indeed, some estimate that fully half of all high school students today carry some sort of forged ID. Technology has made forging fake IDs easier, cheaper, and faster. Today, an "identity package"—green card, Social Security card, and driver's license—can cost as little as $100, down from $300 a few years ago. The growth in ID forgeries has indeed been explosive and the FBI doesn't have the means to even put a dent in it. Police also acknowledge that prosecutions are unusual, both for fake-ID users and forgers. Obviously, it would be advantageous to provide a means for verifying the identification of an individual that can not be forged or duplicated.

U.S. Pat. No. 6,154,844 to Touboul discloses a system comprised of an inspector and a protection engine. The inspector includes a content inspection engine that uses a set of rules to generate a Downloadable security profile corresponding to a Downloadable, e.g., Java™ applets, ActiveX™ controls, JavaScript™ scripts, or Visual Basic scripts. The content inspection engine links the Downloadable security profile to the Downloadable. The set of rules may include a list of suspicious operations, or a list of suspicious code patterns. The first content inspection engine may link to the Downloadable a certificate that identifies the content inspection engine which created the Downloadable security profile. Additional content inspection engines may generate and link additional Downloadable security profiles to the Downloadable. Each additional Downloadable security profile may also include a certificate that identifies its creating content inspection engine. Each content inspection engine preferably creates a Downloadable ID that identifies the Downloadable to which the Downloadable security profile corresponds. The protection includes a Downloadable interceptor for receiving a Downloadable, a file reader coupled to the interceptor for determining whether the Downloadable includes a Downloadable security profile, an engine coupled to the file reader for determining whether to trust the Downloadable security profile, and a security policy analysis engine coupled to the verification engine for comparing the Downloadable security profile against a security policy if the engine determines that the Downloadable security profile is trustworthy. A Downloadable ID verification engine retrieves the Downloadable ID that identifies the Downloadable to which the Downloadable security profile corresponds, generates the Downloadable ID for the Downloadable and compares the generated Downloadable to the linked Downloadable. The protection engine further includes a certificate authenticator for authenticating the certificate that identifies a content inspection engine which created the Downloadable security profile as from a trusted source. The certificate authenticator can also authenticate a certificate that identifies a developer that created the Downloadable. Unfortunately, this prior art example does not provide a method for identifying fraudulent use of stolen credit cards or other IDs.

U.S. Pat. No. 5,987,438 to Nakano discloses an electronic wallet system that is easy to use with high security. The electronic wallet system includes an IC card for storing electronic money information, an IC card reader/writer for reading data from, and writing data into, the IC card, an IC card loader unit for loading the IC card into, and unloading the IC card from, the IC card loader unit, an IC card load controller unit for controlling a load/unload operation of the IC card, and a lock signal generator unit for generating an IC card lock signal in response to an activation of an unload operation by the IC card load controller unit. An electronic wallet system with an ID number specific to the system, applied to a POS system, includes a system ID verification unit and an input unit for inputting data to the system, wherein an IC card can be unloaded in response to an activation of an unload operation by a load controller unit and an input of the system ID from the input unit. Unfortunately, this prior art example does not use finger print identification in order to ensure that a user is the true owner of a given identification card.

U.S. Pat. No. 7,077,310 to Shin discloses a method for switching dual Id verification systems for installing another carrier ID system on an equipment installation complying with SEMI E87. A first identification access system has internally installed on an equipment installation on which a second identification access system is then installed. Both systems are switched using a control flow, and a wafer carrier ID is obtained by the chosen verification system. Unfortunately, this prior art example does not use finger print identification in order to ensure that a user is the true owner of a given identification card.

Accordingly, a biometric charge card verification system is disclosed in order to overcome the above-noted shortcomings. The present invention satisfies such a need by providing a system that is convenient and easy to use, that effectively protects a user's personal information, is lightweight and portable in nature, and reduces the many fraudulent applications for which fake ID cards are used. Such a system effectively uses identification parameters that are unique to an individual, thus ensuring that the card can not be used by any other individual. This effectively eliminates the ability to duplicate the card, thus ensuring that the person's identity can not be stolen. The present invention is simple to use, inexpensive, and designed for many years of repeated use.

BRIEF SUMMARY OF THE INVENTION

The present invention meets the above-mentioned needs by providing a system, method, and computer program product for authorizing a user to execute a sales transaction at a point of sale location. The system also includes software code logic for accessing, in response to receiving a request from the user via the base station, the central monitoring station, and software code logic for processing accessed information located in the database in order to verify a user's identify for the charge card.

A charge card identification system includes a portable base station with a mechanism for heating a top surface area of the base station to a desired temperature such that the user can effectively place a user finger on the selected surface area and elevate a temperature of the user finger as needed. Such a surface area heating mechanism includes a heat pad including a heating element impregnated within the base station, a voltage regulator electrically coupled to the heating element, a control panel electrically coupled to the voltage regulator such that an operator can adjust the temperature of the heat pad, a display screen electrically coupled to the control panel for visually illustrating an operating mode of the heat pad, and a power source electrically mated to the heating element and the display screen.

The system further includes a portable charge card including a mechanism for temporarily and conveniently recording an image of a user finger print when the user finger temperature reaches a minimum temperature threshold such that the finger print image disappears after a surface temperature of the charge card falls below the minimum temperature. Such a user finger print recording mechanism is disposed on a rear face of the charge card and includes a finger print reader with an optical sensor producing a two-dimensional analog image of the user finger based upon detection of valleys and peaks situated on the outer epithelial layer of the user finger.

The user finger print recording mechanism further includes a heat detecting circuit electrically coupled to the finger print reader. Such a heat detecting circuit advantageously generates and transmits first and second control signals to the optical sensor when the surface area temperature of the charge card is greater than and less than the minimum threshold temperature such that the sensor is automatically toggled between operating and non-operating modes and thereby capture and release the user finger print image.

The finger print recording mechanism further includes a processor electrically coupled to the finger print reader and a memory electrically coupled to the processor. Such a memory includes software instructions that effectively cause the finger print reader to calculate the finger print image based upon the detected peaks and valleys of the user finger. Such software instructions execute a control logic algorithm including the steps of: recording a reflection area of the user finger print; parsing the reflection area into a grid of reference points defined within a series of horizontal and vertical lines; calculating an intersection of a central horizontal line and a central vertical line for identifying a center point of the reflection area; assigning numerical values to each of the peaks and valleys of the finger print image; and storing the numerical values in sequence from a top left one of the reference points to a bottom left one of the reference points respectively.

The system further includes a mechanism for conveniently verifying a user identity based upon the recorded finger print image such that the user is authorized to execute the sales transaction. Such a user identity verification mechanism includes a remotely located central monitoring station including a database housing a list of authorized user finger prints associated with a user name, and a user social security number respectively. The mechanism further includes an analog-to-digital converter housed within the charge card. Such a converter generates and transmits a digital output signal of the finger print reflection area.

The user identity verification mechanism further includes a finger print data extraction interface electrically mated to the converter and advantageously modifying the digital output signal to an ASCII formatted image signal. A scanner is connected to the base station for capturing the ASCII formatted image signal, and a communications link is established between the central monitoring station and the base station. The scanner includes at least one of an optical scanner, infrared scanner and magnetic scanner respectively. The ASCII formatted image signal is transmitted to the central monitoring station at which time the database is queried to locate the ASCII formatted image signal. The central monitoring station generates and transmits a corresponding response signal to the base station if the finger print image is associated with an authorized user of the charge card.

The system further includes a mechanism for wirelessly tracking a location of the charge card. Such a wireless tracking mechanism effectively includes a transceiver situated in the charge card and a global positioning satellite system in direct communication with the transceiver via the communications link for determining a real-time location of the charge card.

A method for authorizing a user to execute a sales transaction at a point of sale location by verifying a finger print of the user includes the steps of: providing a portable base station; heating a top surface area of the base station to a desired temperature; placing a user finger on the selected surface area and elevating a temperature of the user finger as needed; providing a portable charge card; temporarily recording an image of a user finger print when the user finger temperature reaches a minimum temperature threshold such that the finger print image disappears after a surface temperature of the charge card falls below the minimum temperature; verifying a user identity based upon the recorded finger print image such that the user is authorized to execute the sales transaction; and wirelessly tracking a location of the charge card.

The method further includes the steps of: providing a finger print reader including an optical sensor; producing a two-dimensional analog image of the user finger based upon detection of valleys and peaks situated on the outer epithelial layer of the user finger; providing a heat detecting circuit electrically coupled to the finger print reader; the heat detecting circuit generating and transmitting first and second control signals to the optical sensor when the surface area temperature of the charge card is greater than and less than the minimum threshold temperature such that the sensor is automatically toggled between operating and non-operating modes and thereby capturing and releasing the user finger print image; providing a processor electrically coupled to the finger print reader; and providing a memory electrically coupled to the processor.

The memory including software instructions that cause the finger print reader to calculate the finger print image based upon the detected peaks and valleys of the user finger. Such software instructions executing a control logic algorithm including the steps of: recording a reflection area of the user finger print; parsing the reflection area into a grid of reference points defined within a series of horizontal and vertical lines; calculating an intersection of a central horizontal line and a central vertical line for identifying a center point of the reflection area; assigning numerical values to each of the peaks and valleys of the finger print image; and storing the numerical values in sequence from a top left one of the reference points to a bottom left one of the reference points respectively.

The method further includes the steps of: providing a remotely located central monitoring station including a database housing a list of authorized user finger prints associated with a user name and a user social security number respectively; providing an analog-to-digital converter housed within the charge card; the converter generating and transmitting a digital output signal of the finger print reflection area; providing a finger print data extraction interface electrically mated to the converter; modifying the digital output signal to an ASCII formatted image signal; providing a scanner connected to the base station; the scanner capturing the ASCII formatted image signal; establishing a communications link between the central monitoring station and the base station; transmitting the ASCII formatted image signal to the central monitoring station; querying the database to locate the ASCII formatted image signal; and the central monitoring station generating and transmitting a corresponding response signal to the base station if the finger print image is associated with an authorized user of the charge card.

The method further includes the steps of: providing a heat pad including a heating element impregnated within the base station; providing a voltage regulator electrically coupled to the heating element; providing a control panel electrically coupled to the voltage regulator such that an operator can adjust the temperature of the heat pad; providing a display screen electrically coupled to the control panel for visually illustrating an operating mode of the heat pad; and providing a power source electrically mated to the heating element and the display screen. The method further includes the steps of: providing a transceiver situated in the charge card; and the transceiver directly communicating with a global positioning satellite system via the communications link for determining a real-time location of the charge card.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
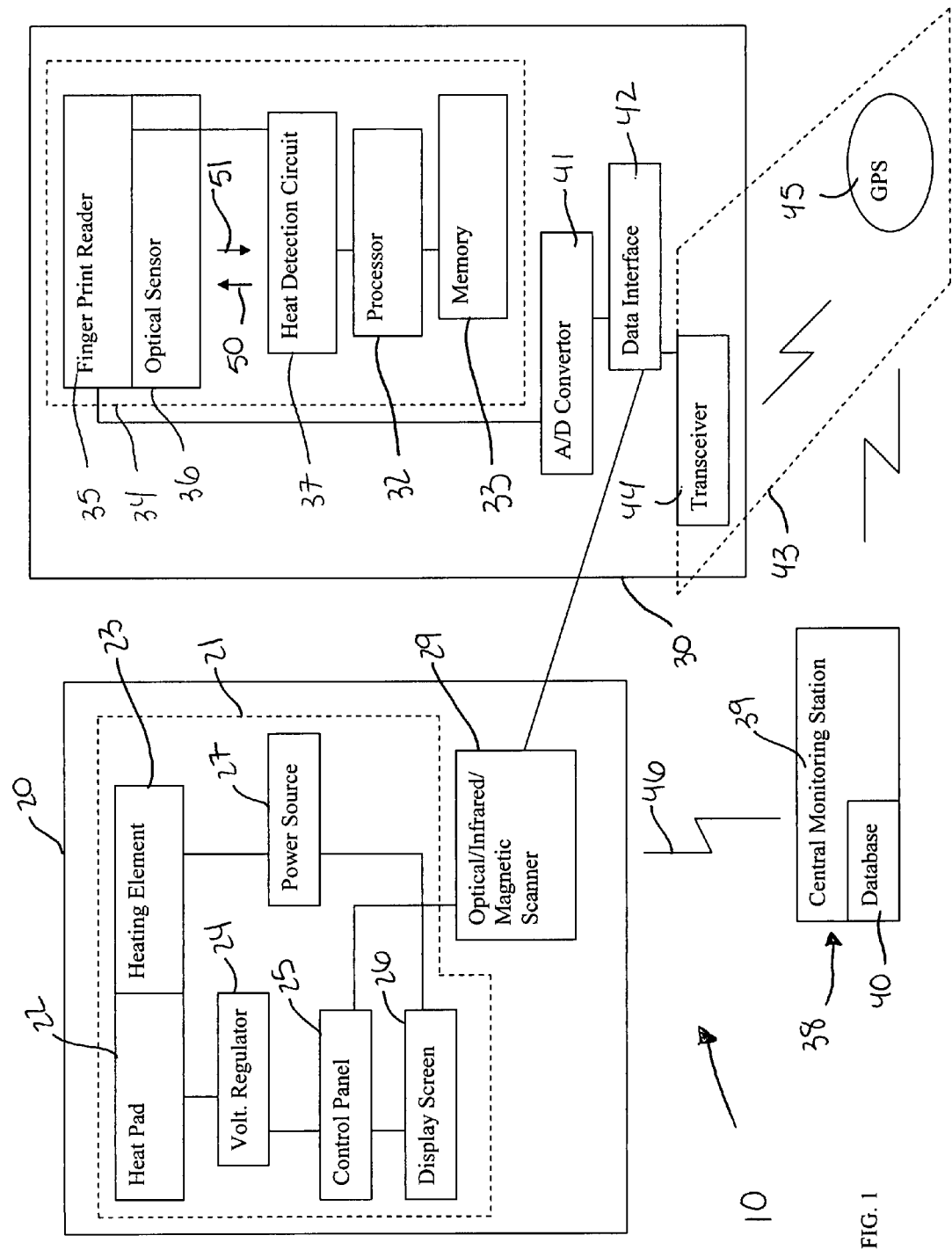
FIG. 1 is a schematic diagram showing the interrelationship between the base station, central monitoring station, GPS system and charge card of the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system, method and computer program product of this invention is referred to generally in FIGS. 1-5 by the reference numeral 10 and is intended to protect a charge card identification system. It should be understood that the present invention may be used to protect many different types of credit or ID cards, and should not be limited in use with only those types of cards mentioned herein.

Referring initially to FIGS. 1, 3, 4 and 5, a charge card identification system 10 includes a portable base station 20 with a mechanism for heating 21 a top surface area of the base station 20 to a desired temperature which is essential such that the user can place a user finger on the selected surface area and elevate a temperature of the user finger as needed. Such a surface area heating mechanism 21 includes a heat pad 22 including a heating element 23 impregnated within the base station 20, a voltage regulator 24 electrically coupled to the heating element 23, a control panel 25 electrically coupled to the voltage regulator 24 such that an operator can adjust the temperature of the heat pad 22, a display screen 26 electrically coupled to the control panel 25 for visually illustrating an operating mode of the heat pad 22, and a power source 27 electrically mated to the heating element 23 and the display screen 26. The base station is provided for scanning a user finger print and verifying the print with the finger print associated with the card being used.

Base station 20 has an input/output connector 28, such as, for example, a USB connector or network database memory card. Base station 20 has a biomarker reader, such as, for example, a scanner 29 which will scan and record finger prints or thumb prints. Charge card 30 also has a transmitter/receiver, processor 32, and memory 33. Such components may comprise standard computer hardware and software known in the art. For example, USB technology useful for connecting base station 20 to a computer to program base station 20 or transmit information from base station to a computer. Wireless technology useful for transmitting and receiving information among a plurality of base station 20 may also be employed.

Figure 2:
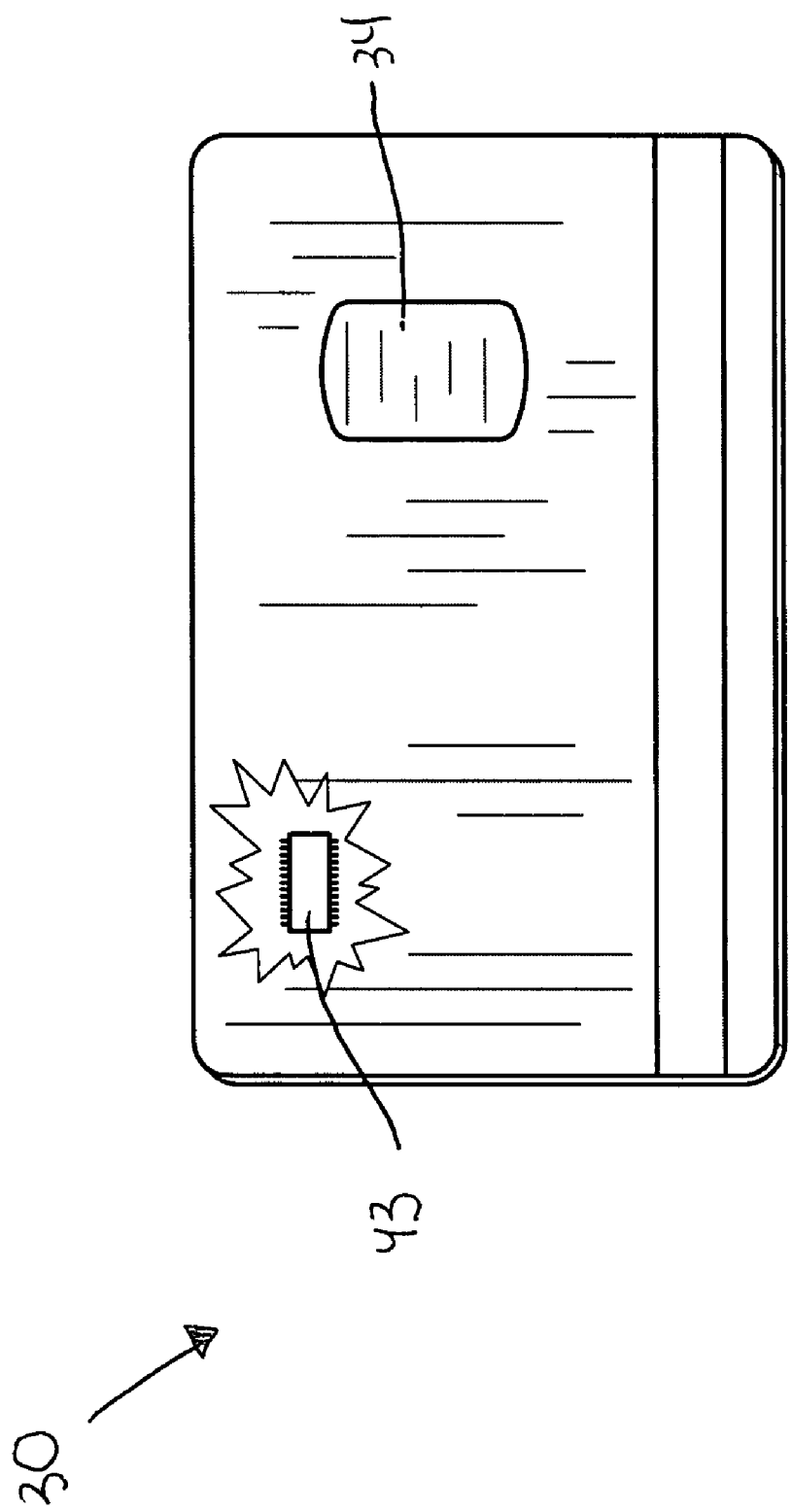
FIG. 2 is a rear elevational view of the charge card, in accordance with the present invention.
Figure 3:
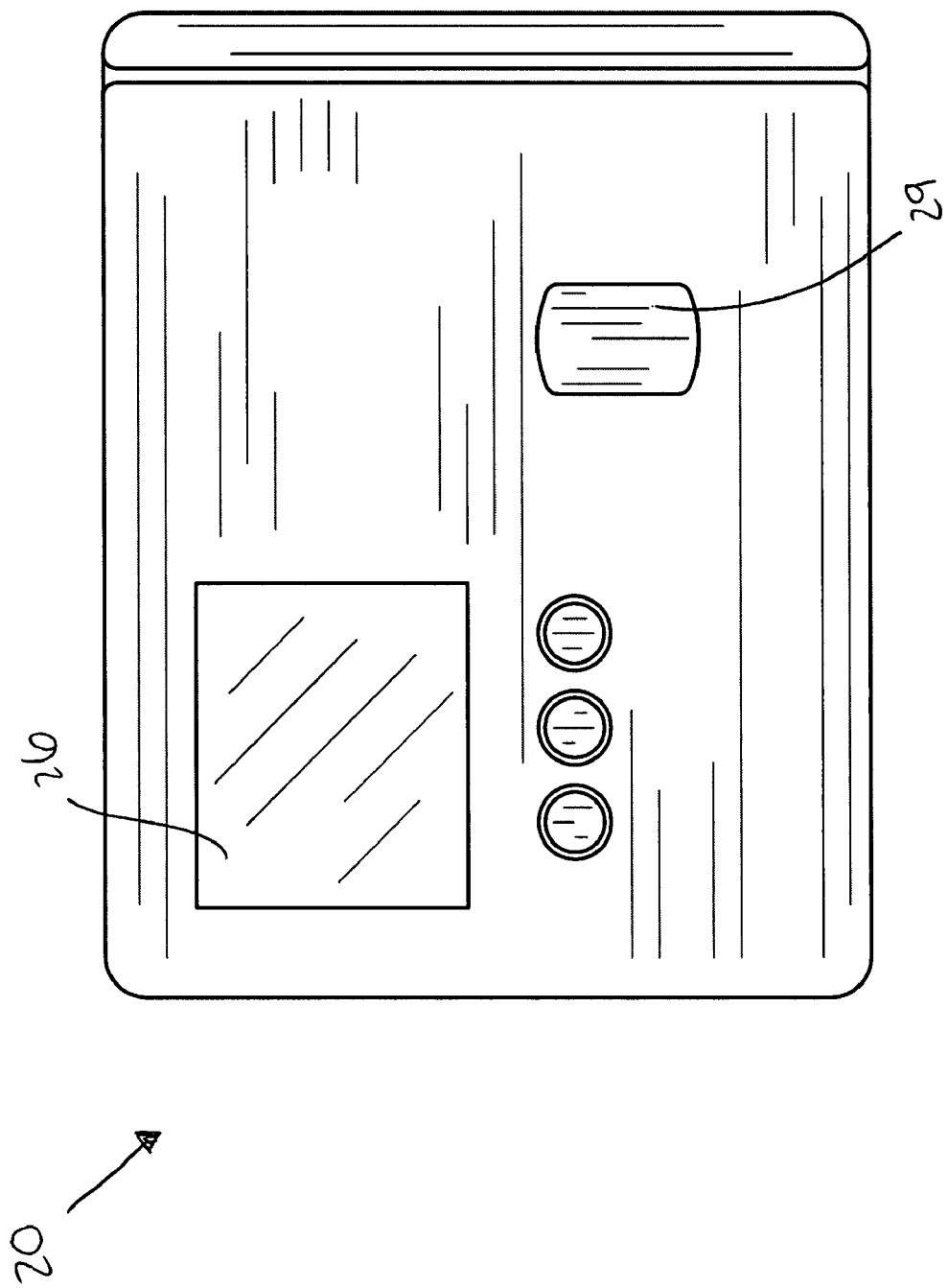
FIG. 3 is a top planar view of the base station, in accordance with the present invention.
Figure 4:
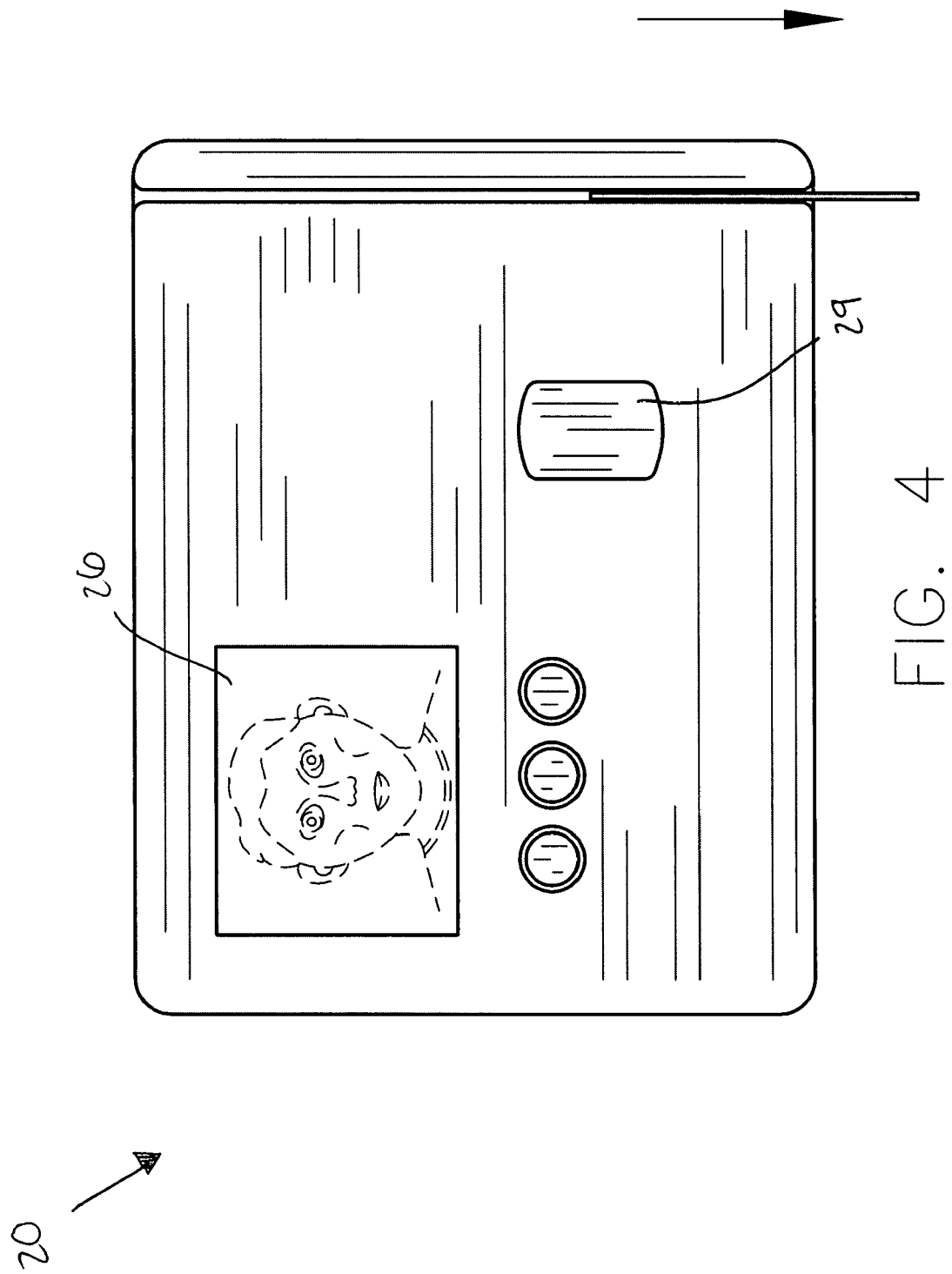
FIG. 4 is a top planar view of the base station, in use with a charge card, in accordance with the present invention.
Figure 5:
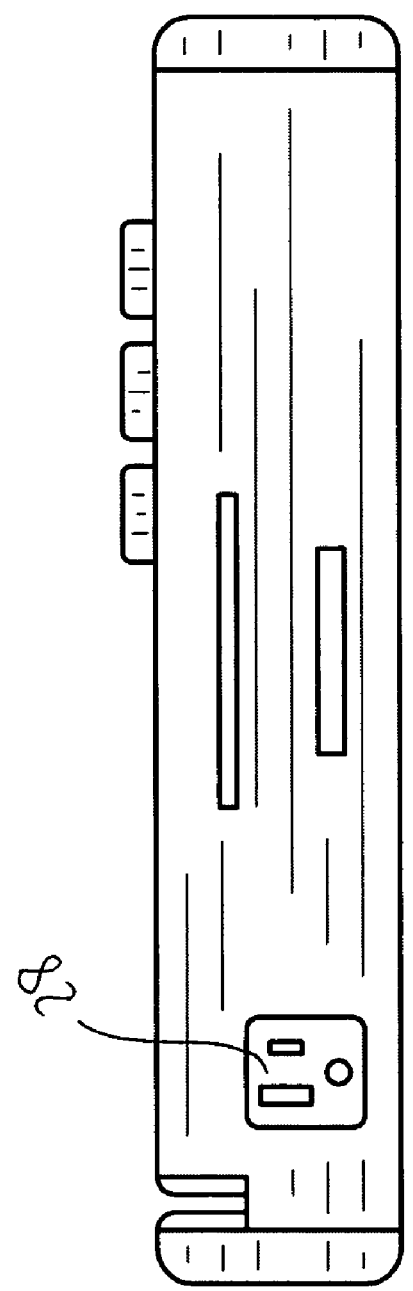
FIG. 5 is a rear elevational view of the base station, in accordance with the present invention.

Referring to FIGS. 1 and 2, the system further includes a portable charge card 30 including a mechanism for temporarily recording an image 34 of a user finger print when the user finger temperature reaches a minimum temperature threshold which is critical such that the finger print image disappears after a surface temperature of the charge card 30 falls below the minimum temperature. Such a user finger print recording mechanism 34 is disposed on a rear face of the charge card 30 and includes a finger print reader 35 with an optical sensor 36 producing a two-dimensional analog image of the user finger based upon detection of valleys and peaks situated on the outer epithelial layer of the user finger. The mechanism 34 further includes a heat detecting circuit 37 electrically coupled to the finger print reader 35. Such heat detecting circuit 37 generates and transmits first and second control signals to the optical sensor when the surface area temperature of the charge card 30 is greater than and less than the minimum threshold temperature which is crucial such that the sensor 36 is automatically toggled between operating and non-operating modes and thereby capture and release the user finger print image. The card is embedded with the user's finger print when the card is first issued, and may be programmed to recognize more than one finger print, as necessary.

Referring to FIG. 1, the finger print recording mechanism 34 further includes a processor 32 electrically coupled to the finger print reader 35 and a memory 33 electrically coupled to the processor 32. Such a memory 33 includes software instructions that cause the finger print reader 35 to calculate the finger print image based upon the detected peaks and valleys of the user finger. Such software instructions execute a control logic algorithm including the steps of: recording a reflection area of the user finger print; parsing the reflection area into a grid of reference points defined within a series of horizontal and vertical lines; calculating an intersection of a central horizontal line and a central vertical line for identifying a center point of the reflection area; assigning numerical values to each of the peaks and valleys of the finger print image; and storing the numerical values in sequence from a top left one of the reference points to a bottom left one of the reference points respectively.

The finger print recording mechanism 34 provides a secure identification of a user on charge card 30 and base station 20, after scanning procedures. Structurally, the storage unit may be a database included within or externally connected to the base station 20 unit via a wireless or wireline communications link. Alternatively, the storage unit may be a memory chip storing the identity patterns for each person presented for identification. This latter case is preferable when, for example, the system is formed as an integrated unit. Those skilled in the art can appreciate that other forms of storage devices maybe used to store the identity patterns in accordance with the present invention.

Referring again to FIG. 1, the system 10 further includes a mechanism for verifying a user identity 38 based upon the recorded finger print image which is vital such that the user is authorized to execute the sales transaction. Such a user identity verification mechanism 38 includes a remotely located central monitoring station 39 including a database housing 40, a list of authorized user finger prints associated with a user name, and a user social security number respectively. The mechanism 38 further includes an analog-to-digital converter 41 housed within the charge card 30. Such a converter 41 generates and transmits a digital output signal of the finger print reflection area.

Referring again to FIG. 1, the user identity verification mechanism 38 further includes a finger print data extraction interface 42 electrically mated to the converter 41 and modifying the digital output signal to an ASCII formatted image signal. A scanner 29 is connected to the base station 20 for capturing the ASCII formatted image signal, and a communications link is established between the central monitoring station 39 and the base station 20. The scanner 29 includes at least one of an optical scanner, infrared scanner and magnetic scanner respectively. The ASCII formatted image signal is transmitted to the central monitoring station 39 at which time the database is queried to locate the ASCII formatted image signal. The central monitoring station 39 generates and transmits a corresponding response signal to the base station 20 if the finger print image is associated with an authorized user of the charge card 30.

The base station 20 or the central monitoring station 39 compares the recorded finger print image received from the sensor 36 with one or more identity patterns in the storage unit. The comparison function is performed by a processor (not shown) under control of an application program stored in a memory (not shown). The type of comparison performed depends on the type of distortion imposed on the print. For example, the comparison may involve a spectrum signal analysis or a pattern recognition analysis performed using a neural network, statistical model, or other type of signal processing technique. As an added measure of security, the base station 20 may be protected by a firewall and an interface unit (not shown) may be included for transmitting or receiving data, instructions, or other information from the central monitoring station.

Referring again to FIG. 1, the system further includes a mechanism for wirelessly tracking a location 43 of the charge card 30. Such a wireless tracking mechanism 43 includes a transceiver 44 situated in the charge card 30 and a global positioning satellite system 45 in direct communication with the transceiver 44 via the communications link for determining a real-time location of the charge card 30.

The wireless tracking mechanism 43, preferably employs a global positioning system (GPS) that is a constellation of Earth-orbiting satellites that transmit standard signals that can be used to establish the location and velocity of a user equipped with a suitable GPS receiver. For civilian applications, the basic signals are "C/A codes" or Gold Codes, pseudo-random noise (PN) sequences, transmitted as repeated frames of 1023 chips at a chip rate of 1023 chips/ms (.ident.one frame per millisecond). Each satellite is assigned a unique PN sequence, the PN sequences of the various satellites being mutually orthogonal.

Superimposed on the PN sequence of each GPS satellite is a continuously repeating Satellite Data Message (SDM), of 30 seconds duration, transmitted at a rate of 50 bits per second. The complete SDM is therefore 1500 bits long. Each bit (+1 or −1) of the SDM is modulated onto the satellite's signal by multiplying 20 consecutive frames of the PN sequence by that bit. The first 900 bits of the SDM include the satellite ephemeris and time model for the respective satellite. The remaining 600 bits of the SDM include a portion of the GPS almanac, which is a 15,000 bit block of coarse ephemeris and time model data for the entire GPS system. In addition, bits 1-8, bits 301-308, bits 601-608, bits 901-908 and bits 1201-1208 of every SDM are identical 8-bit (160 millisecond) headers that are invariant in time and that are identical in all the GPS satellites. Bits 31-60, bits 331-360, bits 631-660, bits 931-960 and bits 1231-1260 of every SDM are 30-bit (600 millisecond) hand-over words that are time-variant (these hand-over words include representations of the time of the week), but are, like the headers, identical in all the GPS satellites.

The present invention may be run, instead of locally or on proprietary equipment, via the global Internet. In such an embodiment, the central monitoring station 38 would allow access, on a subscriber per-use basis, to the database 40 via a World-Wide Web (WWW) site on the Internet. That is, either stand-alone users or enterprise users may subscribe to the central monitoring station's WWW site and pay on a per-use basis.

Such a database would be consistently researched and periodically updated by the service provider. The updated public information database, in order to provide the desired reliability, may then be distributed to subscribers (i.e., users) via several different means (e.g., electronic media, via Internet or FTP download, or automatically upon Internet access).

The present invention (system, process or any part(s) thereof) may be implemented using hardware, software or a combination thereof and may be implemented in one or more computer systems or other processing systems. In fact, in one embodiment, the invention is directed toward one or more base stations 20 capable of carrying out the functionality described herein. The base station 20 may be connected to a communication infrastructure (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

The base station 20 can include a display interface that forwards graphics, text, and other data from the communication infrastructure (or from a frame buffer not shown) for display on the base station display screen.

In an alternate embodiment, the base station 20 may include a main memory, preferably random access memory (RAM), and may also include a secondary memory. The secondary memory may include, for example a hard disk drive, an optical disk drive, etc. The removable storage drive xx reads from and/or writes to a removable storage unit in a well known manner. Removable storage unit, represents a floppy disk, magnetic tape, optical disk, etc. which is read by and written to by removable storage drive. As will be appreciated, the removable storage unit includes a computer usable storage medium having stored therein computer software and/or data.

In alternative embodiments, secondary memory may include other similar means for allowing computer programs or other instructions to be loaded into base station 20. Such means may include, for example, a removable storage unit and an interface. Examples of such may include a program cartridge and cartridge interface (such as that found in video game devices), a removable memory chip (such as an EPROM, or PROM) and associated socket, and other removable storage units and interfaces which allow software and data to be transferred from the removable storage unit to base station xx.

Base station 20 may also include a communications link xx. Communications link 46 allows software and data to be transferred between base station 20 and external devices, such as the central monitoring station 39. Examples of communications link 46 may include a modem, a network interface, (such as an Ethernet card), a communications port, a PCMCIA slot and card, etc. Software and data transferred via communications link are in the form of signals which may be electronic, electromagnetic, optical or other signals capable of being received by communications link. These signals are provided to central monitoring station 39 via a communications link (i.e., channel). This link 46 carries signals and may be implemented using wire or cable, fiber optics, a phone line, a cellular phone link, an RF link and other communications channels.

In this document, the terms "computer program medium" and "computer usable medium" are used to generally refer to media such as removable storage drive, a hard disk installed in a hard disk drive, and signals. These computer program products are means for providing software to base station 20. The invention is directed to such computer program products, for example.

Computer programs (also called computer control logic) are stored in main memory and/or secondary memory. Computer programs may also be received via communications link 46. Such computer programs, when executed, enable the base station 20 to perform the features of the present invention as discussed herein. In particular, the computer programs, when executed, enable a processor (not shown) to perform the features of the present invention. Accordingly, such computer programs represent controllers of the base station 20.

In an embodiment where the invention is implemented using software, the software may be stored in a computer program product and loaded into computer system (not shown) using removable storage drive (not shown), hard drive (not shown) or communications interface (not shown). The control logic (software), when executed by the processor 32, causes the processor 32 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

The system provides a user the unexpected benefit of ensuring that only the proper owner of an identification card may use the card. The identification is coded with a user's fingerprint, which will be verified every time the card is used. The base station provides the unexpected benefit of performing verification with ease, no matter where the card is used. In addition, a tracking chip may be added into any identification card, for added security. This chip ensures that a card may be located at any given time by activating the satellite tracking system, and would prove especially advantageous for bank/credit card companies, military officials, and immigration or probation departments. Such benefits overcome the prior art shortcomings.

In use, a method for authorizing a user to execute a sales transaction at a point of sale location by verifying a finger print of the user includes the steps of: providing a portable base station 20; heating a top surface area of the base station 20 to a desired temperature; placing a user finger on the selected surface area and elevating a temperature of the user finger as needed; providing a portable charge card 30; temporarily recording an image of a user finger print when the user finger temperature reaches a minimum temperature threshold such that the finger print image disappears after a surface temperature of the charge card 30 falls below the minimum temperature; verifying a user identity based upon the recorded finger print image such that the user is authorized to execute the sales transaction; and wirelessly tracking a location of the charge card 30.

In use, the method further includes the steps of: providing a finger print reader 35 including an optical sensor 36; producing a two-dimensional analog image of the user finger based upon detection of valleys and peaks situated on the outer epithelial layer of the user finger; providing a heat detecting circuit 37 electrically coupled to the finger print reader 35; the heat detecting circuit 37 generating and transmitting first and second control signals 50, 51 to the optical sensor 36 when the surface area temperature of the charge card 30 is greater than and less than the minimum threshold temperature such that the sensor 36 is automatically toggled between operating and non-operating modes and thereby capturing and releasing the user finger print image; providing a processor 32 electrically coupled to the finger print reader 35; and providing a memory 33 electrically coupled to the processor 32.

In use, the memory 33 including software instructions that cause the finger print reader 35 to calculate the finger print image based upon the detected peaks and valleys of the user finger. Such software instructions executing a control logic algorithm including the steps of: recording a reflection area of the user finger print; parsing the reflection area into a grid of reference points defined within a series of horizontal and vertical lines; calculating an intersection of a central horizontal line and a central vertical line for identifying a center point of the reflection area; assigning numerical values to each of the peaks and valleys of the finger print image; and storing the numerical values in sequence from a top left one of the reference points to a bottom left one of the reference points respectively.

In use, the method further includes the steps of: providing a remotely located central monitoring station 39 including a database housing 40 a list of authorized user finger prints associated with a user name and a user social security number respectively; providing an analog-to-digital converter 41 housed within the charge card 30; the converter 41 generating and transmitting a digital output signal of the finger print reflection area; providing a finger print data extraction interface 42 electrically mated to the converter 41; modifying the digital output signal to an ASCII formatted image signal; providing a scanner 29 connected to the base station 20; the scanner 29 capturing the ASCII formatted image signal; establishing a communications link between the central monitoring station 39 and the base station 20; transmitting the ASCII formatted image signal to the central monitoring station 39; querying the database 40 to locate the ASCII formatted image signal; and the central monitoring station 39 generating and transmitting a corresponding response signal to the base station 20 if the finger print image is associated with an authorized user of the charge card.

In use, the method further includes the steps of: providing a heat pad 22 including a heating element 23 impregnated within the base station 20; providing a voltage regulator 24 electrically coupled to the heating element 23; providing a control panel 25 electrically coupled to the voltage regulator 24 such that an operator can adjust the temperature of the heat pad 22; providing a display screen 26 electrically coupled to the control panel 25 for visually illustrating an operating mode of the heat pad 22; and providing a power source 27 electrically mated to the heating element 23 and the display screen 26. The method further includes the steps of: providing a transceiver 44 situated in the charge card 30; and the transceiver 44 directly communicating with a global positioning satellite system 45 via the communications link for determining a real-time location of the charge card 30.

This system is designed to prevent identity theft. Once it has gone nationwide, the system will be 95 to 98 percent effective. The internet will then be the only area left to cover with regards to credit card fraud. Man has focused for years on creating plastic cards for financing, in order to eliminate paper money transactions. This system is the first step towards that goal. Credit card companies should use this system to gain leverage with insurance companies in order to lower premiums. This enables banks to lower their interest rates. With lower interest rates and this security system, consumers will be more willing to use credit cards rather than paper money. This, in turn, will boost financial transactions and thereby stimulate the economy. Credit card statements provide an easy way for tracking finances and thereby ensure customer satisfaction.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A charge card identification system for authorizing a user to execute a sales transaction at a point of sale location, said charge card identification system comprising:
   a base station comprising means for heating a top surface area of said base station to a desired temperature such that the user can place a user finger on said selected surface area and elevate a temperature of the user finger as needed;
   a portable charge card comprising means for temporarily recording an image of a user finger print when the user finger temperature reaches a minimum temperature threshold such that said finger print image disappears after a surface temperature of said charge card falls below said minimum temperature;
   means for verifying a user identity based upon said recorded finger print image such that the user is authorized to execute the sales transaction;
   means for wirelessly tracking a location of said charge card;
   wherein said user finger print recording means comprises
   a finger print reader including an optical sensor producing a two-dimensional analog image of the user finger based upon detection of valleys and peaks situated on the outer epithelial layer of the user finger;
   a heat detecting circuit electrically coupled to said finger print reader, said heat detecting circuit generating and transmitting first and second control signals to said optical sensor when the surface area temperature of said charge card is greater than and less than the minimum threshold temperature such that said sensor is automatically toggled between operating and non-operating modes and thereby capture and release the user finger print image;
   a processor electrically coupled to said finger print reader;
   a memory electrically coupled to said processor, said memory including software instructions that cause said finger print reader to calculate said finger print image based upon the detected peaks and valleys of the user finger, said software instructions executing a control logic algorithm including the steps of
   a. recording a reflection area of the user finger print,
   b. parsing the reflection area into a grid of reference points defined within a series of horizontal and vertical lines,
   c. calculating an intersection of a central horizontal line and a central vertical line for identifying a center point of said reflection area;
   d. assigning numerical values to each of said peaks and valleys of said finger print image; and
   e. storing said numerical values in sequence from a top left one of said reference points to a bottom left one of said reference points respectively;
   wherein said user identity verification means comprises a remotely located central monitoring station comprising a database housing a list of authorized user finger prints associated with a user name and a user social security number respectively;

an analog-to-digital converter housed within said charge card, said converter generating and transmitting a digital output signal of said finger print reflection area;

a finger print data extraction interface electrically mated to said converter and modifying said digital output signal to an ASCII formatted image signal;

a scanner connected to said base station for capturing said ASCII formatted image signal; and a communications link established between said central monitoring station and said base station;

wherein said ASCII formatted image signal is transmitted to said central monitoring station at which time said database is queried to locate said ASCII formatted image signal, said central monitoring station generating and transmitting a corresponding response signal to said base station if said finger print image is associated with an authorized user of said charge card.

2. The charge card identification system of claim 1, wherein said surface area heating means comprises:

a heat pad including a heating element impregnated within said base station;

a voltage regulator electrically coupled to said heating element;

a control panel electrically coupled to said voltage regulator such that an operator can adjust the temperature of said heat pad;

a display screen electrically coupled to said control panel for visually illustrating an operating mode of said heat pad; and a power source electrically mated to said heating element and said display screen.

3. The charge card identification system of claim 2, wherein said wireless tracking means comprises:

a transceiver situated in said charge card; and a global positioning satellite system in direct communication with said transceiver via said communications link for determining a real-time location of said charge card.

4. The charge card identification system of claim 1, wherein said scanner comprises at least one of an optical scanner, infrared scanner and magnetic scanner respectively.

5. A charge card identification system for authorizing a user to execute a sales transaction at a point of sale location, said charge card identification system comprising:

a portable base station comprising means for heating a top surface area of said base station to a desired temperature such that the user can place a user finger on said selected surface area and elevate a temperature of the user finger as needed;

a portable charge card comprising means for temporarily recording an image of a user finger print when the user finger temperature reaches a minimum temperature threshold such that said finger print image disappears after a surface temperature of said charge card falls below said minimum temperature, said user finger print recording means being disposed on a rear face of said charge card;

means for verifying a user identity based upon said recorded finger print image such that the user is authorized to execute the sales transaction; and means for wirelessly tracking a location of said charge card;

wherein said user finger print recording means comprises a finger print reader including an optical sensor producing a two-dimensional analog image of the user finger based upon detection of valleys and peaks situated on the outer epithelial layer of the user finger;

a heat detecting circuit electrically coupled to said finger print reader, said heat detecting circuit generating and transmitting first and second control signals to said optical sensor when the surface area temperature of said charge card is greater than and less than the minimum threshold temperature such that said sensor is automatically toggled between operating and non-operating modes and thereby capture and release the user finger print image;

a processor electrically coupled to said finger print reader; and a memory electrically coupled to said processor, said memory including software instructions that cause said finger print reader to calculate said finger print image based upon the detected peaks and valleys of the user finger, said software instructions executing a control logic algorithm including the steps of
  a. recording a reflection area of the user finger print,
  b. parsing the reflection area into a grid of reference points defined within a series of horizontal and vertical lines,
  c. calculating an intersection of a central horizontal line and a central vertical line for identifying a center point of said reflection area;
  d. assigning numerical values to each of said peaks and valleys of said finger print image; and
  e. storing said numerical values in sequence from a top left one of said reference points to a bottom left one of said reference points respectively;

wherein said user identity verification means comprises:

a remotely located central monitoring station comprising a database housing a list of authorized user finger prints associated with a user name and a user social security number respectively;

an analog-to-digital converter housed within said charge card, said converter generating and transmitting a digital output signal of said finger print reflection area;

a finger print data extraction interface electrically mated to said converter and modifying said digital output signal to an ASCII formatted image signal;

a scanner connected to said base station for capturing said ASCII formatted image signal; and a communications link established between said central monitoring station and said base station;

wherein said ASCII formatted image signal is transmitted to said central monitoring station at which time said database is queried to locate said ASCII formatted image signal, said central monitoring station generating and transmitting a corresponding response signal to said base station if said finger print image is associated with an authorized user of said charge card;

wherein said surface area heating means comprises a heat pad including a heating element impregnated within said base station;

a voltage regulator electrically coupled to said heating element;

a control panel electrically coupled to said voltage regulator such that an operator can adjust the temperature of said heat pad;

a display screen electrically coupled to said control panel for visually illustrating an operating mode of said heat pad; and a power source electrically mated to said heating element and said display screen, said power source being isolated from said base station and thereby independently supplies power to said portable charge card.

6. The charge card identification system of claim 5, wherein said wireless tracking means comprises:
   a transceiver situated in said charge card; and
   a global positioning satellite system in direct communication with said transceiver via said communications link for determining a real-time location of said charge card.

7. The charge card identification system of claim 5, wherein said scanner comprises at least one of an optical scanner, infrared scanner and magnetic scanner respectively.

8. A method for authorizing a user to execute a sales transaction at a point of sale location by verifying a finger print of the user, said method comprising the steps of:
   a. providing a portable base station;
   b. heating a top surface area of said base station to a desired temperature;
   c. placing a user finger on said selected surface area and elevating a temperature of the user finger as needed;
   d. providing a portable charge card;
   e. temporarily recording an image of a user finger print when the user finger temperature reaches a minimum temperature threshold such that said finger print image disappears after a surface temperature of said charge card falls below said minimum temperature;
   f. verifying a user identity based upon said recorded finger print image such that the user is authorized to execute the sales transaction; and
   g. wirelessly tracking a location of said charge card;
   wherein step e. comprises the steps of:
   providing a finger print reader including an optical sensor;
   producing a two-dimensional analog image of the user finger based upon detection of valleys and peaks situated on the outer epithelial layer of the user finger;
   providing a heat detecting circuit electrically coupled to said finger print reader;
   said heat detecting circuit generating and transmitting first and second control signals to said optical sensor when the surface area temperature of said charge card is greater than and less than the minimum threshold temperature such that said sensor is automatically toggled between operating and non-operating modes and thereby capturing and releasing the user finger print image;
   providing a processor electrically coupled to said finger print reader; and
   providing a memory electrically coupled to said processor, said memory including software instructions that cause said finger print reader to calculate said finger print image based upon the detected peaks and valleys of the user finger, said software instructions executing a control logic algorithm including the steps of
   a. recording a reflection area of the user finger print,
   b. parsing the reflection area into a grid of reference points defined within a series of horizontal and vertical lines,
   c. calculating an intersection of a central horizontal line and a central vertical line for identifying a center point of said reflection area;
   d. assigning numerical values to each of said peaks and valleys of said finger print image; and
   e. storing said numerical values in sequence from a top left one of said reference points to a bottom left one of said reference points respectively;
   wherein step f. comprises the steps of:
   providing a remotely located central monitoring station comprising a database housing a list of authorized user finger prints associated with a user name and a user social security number respectively;
   providing an analog-to-digital converter housed within said charge card;
   said converter generating and transmitting a digital output signal of said finger print reflection area;
   providing a finger print data extraction interface electrically mated to said converter:
   modifying said digital output signal to an ASCII formatted image signal;
   providing a scanner connected to said base station;
   said scanner capturing said ASCII formatted image signal;
   establishing a communications link between said central monitoring station and said base station;
   transmitting said ASCII formatted image signal to said central monitoring station;
   querying said database to locate said ASCII formatted image signal; and
   said central monitoring station generating and transmitting a corresponding response signal to said base station if said finger print image is associated with an authorized user of said charge card.

9. The method of claim 8, wherein step b. comprises the steps of:
   providing a heat pad including a heating element impregnated within said base station;
   providing a voltage regulator electrically coupled to said heating element;
   providing a control panel electrically coupled to said voltage regulator such that an operator can adjust the temperature of said heat pad;
   providing a display screen electrically coupled to said control panel for visually illustrating an operating mode of said heat pad; and
   providing a power source electrically mated to said heating element and said display screen.

10. The method of claim 9, wherein step g. comprises the steps of:
   providing a transceiver situated in said charge card; and
   said transceiver directly communicating with a global positioning satellite system via said communications link for determining a real-time location of said charge card.

* * * * *